3,458,495
REACTION PRODUCT OF A PHOSPHO-
SULFURIZED HYDROCARBON AND
AN ALKYLENE AMINO PHENOL AND
METHOD FOR PREPARING
Edwin C. Younghouse, Cranford, and Jerome Panzer,
Roselle Park, N.J., assignors to Esso Research and Engineering Company, a corporation of Delaware
No Drawing. Filed Sept. 16, 1965, Ser. No. 487,915
Int. Cl. C07f 9/04; C10m 3/42
U.S. Cl. 260—136                                              7 Claims

ABSTRACT OF THE DISCLOSURE

The reaction product of one equivalent of a phosphosulfurized hydrocarbon and from one-half to four equivalents of an alkylene amino phenol is a highly effective oxidation inhibitor and dispersant-detergent for an oil composition such as a gasoline, fuel oil, a heating oil or a lubricating oil, particularly a gas engine lubricant. The phosphosulfurized hydrocarbon is prepared by reacting a terpene, a petroleum fraction, or a 500 to 200,000 molecular weight polymer of a $C_2$ to $C_6$ olefin with from 5 to 40 weight percent of a sulfide of phosphorus. The alkylene amino phenol is prepared by reaction of an aldehyde of from 1 to 7 carbon atoms with an alkylene polyamine having alkylene groups of from 2 to 6 carbon atoms, and having from 2 to 10 nitrogen atoms, with an alkyl phenol having alkyl groups totaling about 4 to 24 carbon atoms. From 1 to 2 moles of alkyl phenol and from 1 to 4 moles of aldehyde are reacted with from 0.5 to 2 moles of alkylene polyamine to prepare the alkylene amino phenol.

---

The present invention concerns improvements in oil-soluble nitrogen-containing additives for oil compositions including gasolines, fuel oils, heating oils, and lubricating oils. These additives may be characterized as reaction products of phosphosulfurized hydrocarbons and alkylene amino phenols. The invention is also directed to the preparation of these reaction products and to oleaginous compositions containing them. The additives are of particular use in gas engine lubricants.

Numerous addition agents are known in the prior art for improving the desirable properties of fuels and lubricants such as oxidation stability, freedom from the formation of insoluble material, protection from rust and corrosion, and the like. For heavy duty service in high compression piston-type internal combustion engines, including automotive gasoline engines, gas engines, and railroad diesel engines, the major requirements are good oxidation stability and good dispersancy and detergency. By dispersancy is meant the prevention of the deposition of insoluble material, and by detergency is meant the quality of removing deposits where they have been formed. In the field of railroad diesel engine lubrication and gas engine lubrication, the criteria that must be met by the lubricants include high oxidation stability and retention of viscosity during use. Satisfactory protection from wear and from rust and corrosion is also, of course, desirable. Additives for heating oils must supply acceptable oxidation stability and freedom from sludge formation. There is also considerable demand for additives for gasolines to impart rust-preventing properties, carburetor detergency action, and surface ignition control.

It has now been found in accordance with the present invention that highly effective dispersants and inhibitors for lubricating oils and fuels can be prepared by the interaction of alkylene amino phenols with phosphosulfurized hydrocarbons. Proportions of from one-half to four equivalents of the alkylene amino phenol to one equivalent of the phosphosulfurized hydrocarbon may be used, but adducts prepared from proportions of one to one are preferred.

The alkylene amino phenols that are employed in the present invention are prepared by reacting an aldehyde of from about 1 to about 7 carbon atoms with an alkylene polyamine having alkylene groups of from 2 to 6 carbon atoms and having from 2 to 10 nitrogen atoms and with an alkyl phenol having alkyl groups totaling from about 4 to about 24 carbon atoms. Generally, in preparing the alkylene amino phenols, from 1 to 2 moles of alkyl phenol and from 1 to 4 moles of aldehyde are reacted with from 0.5 to 2 moles of the alkylene polyamine. The aldehydes that may be employed include formaldehyde, acetaldehyde, propionaldehyde, butyraldehyde, and benzaldehyde. Aliphatic aldehydes are preferred, and formaldehyde is particularly preferred.

The polyamines include ethylene diamine, propylene diamine, diethylene triamine, butylene diamine, triethylene tetramine, tetraethylene pentamine, octaethylene nonamine, and the like. The alkaline polyamines may be characterized by the general formula:

$$H(HN\text{---}R)_nNH_2$$

wherein R is a substituted or unsubstituted $C_2$ to $C_6$ alkylene radical and $n$ is an integer from 1 to 10. Preferred polyamines are the alkylene diamines, with ethylene diamine being particularly preferred.

The alkyl phenols are typified by at least one phenol nucleus having at least one alkyl group, the alkyl groups having a total from 4 to about 24 carbon atoms, and preferably from about 6 to about 16 carbon atoms. The alkyl phenols include monotertiary butyl phenol, ditertiary butyl phenol, tritertiary amyl phenol, methylene bis phenol, tertiary octyl phenol, dilauryl phenol, nonylphenol, dodecyl phenol, and cetyl phenol.

A particular alkylene amino phenol for use in this invention is prepared from paraformaldehyde, ethylene diamine, and nonylphenol.

It is preferred to prepare the alkylene amino phenols in solution using solvents such as methanol, isopropanol, benzene, toluene, xylene, or the like. It is especially preferred to employ a hydrocarbon oil and particularly a mineral lubricating oil as the diluent in the reaction because this eliminates the need for removing solvent at the end of the reaction and for then blinding the material in mineral oil. Most conveniently the alkyl phenol and the polyamine are dissolved in a light lubricating oil fraction, and then the aldehyde is added. The resulting mixture is heated to a temperature within the range of about 150° to about 200° F. and maintained at that temperature for about 1 to 6 hours. The final reaction mixture is then heated to an elevated temperautre, e.g., about 300° to 325° F. and stripped with nitrogen to remove any water of reaction that may not have left the system. If necessary, the product is filtered for clarity.

Depending upon the relative mole ratios of the reactants, the reaction product will have any one of a variety of general formulas. If an alkyl phenol, ethylene diamine, and formaldehyde are used in equal molar ratios, the product is believed to have the approximate formula given below, in which R represents the alkyl group or groups of the starting phenol:

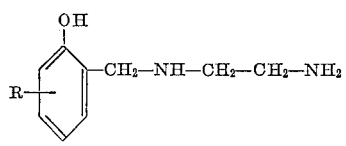

In accordance with the present invention, the alkylene amino phenols prepared as described above are further reacted with phosphosulfurized hydrocarbons. The preparation of phosphosulfurized hydrocarbons is well known in the art and involves reacting a sulfide of phosphorus such as $P_2S_3$, $P_2S_5$, $P_4S_7$, and the like, and preferably $P_2S_5$, with a hydrocarbon material such as a terpene, a heavy petroleum fraction, or a polyolefin. The preparation of phosphosulfurized hydrocarbons is more fully described in U.S. Patent 2,875,188 and in U.S. Patent 2,316,078. The preferred hydrocarbon materials for treatment with phosphorus sulfides are the olefin polymers having Staudinger molecular weights in the range of about 500 to about 200,000 and containing from 2 to 6 carbon atoms per olefin monomer. Polymers of ethylene, propylene, butylene, isobutylene, or isoamylene may be employed, for example. Particularly preferred are the polymers of butylene or isobutylene having Staudinger molecular weights in the range of from about 500 to about 200,000. The phosphosulfurized hydrocarbon can be prepared by reacting the hydrocarbon base stock with from about 5 to 40 wt. percent of a sulfide of phosphorus and preferably with from about 10 to 20 wt. percent of phosphorus pentasulfide. The reaction is conducted under anhydrous conditions at temperatures from about 150° to about 600° F. for from about ½ to about 15 hours. In addition to polyolefins other hydrocarbons may be employed such as a terpene, e.g., pinene, or a petroleum distillate or a residuum containing less than 5% of aromatic hydrocarbons and having a viscosity at 210° F. in the range of from about 140 to about 250 SUS.

To prepare the additives of the present invention, the phosphosulfurized hydrocarbon is reacted with 0.5 to 4 equivalents of the alkylene amino phenol. The additives are particularly effective for use in gas engine lubricants if the equivalents ratios are 1:1. The proper proportions of the two reactants are readily determined by measuring the neutralization numbers of each of the reactants. The reaction may be conducted at temperatures in the range of 200° to 450° F. but a temperature range of about 350° to 400° F. is preferred. In some cases partial decomposition occurs at temperatures over 400° F., causing evolution of $H_2S$ and given additives that are somewhat deficient in their performance in gas engine lubrication. Reaction time may require from 2 to 16 hours and is somewhat related to mixing efficiency. With good agitation the reaction is normally completed in about 4 hours. If mixing efficiency tends to be poor the use of a slightly reduced pressure and/or sparging with an inert gas such as nitrogen may aid in completion of the reaction. Completion of the reaction is indicated by a relatively low rate of $H_2S$ evolution from a blend of 5 wt. percent of a sample of the reaction mixture in a mineral oil when the blend has been heated in a closed space for one hour at 100° F. More specifically a rating of 3 or less in the lead acetate test hereinafter described in Example 4 is considered as indicating completion of the reaction. In this test the original phosphosulfurized hydrocarbon, being unstable with respect to $H_2S$ evolution, will have a rating of 5 or greater.

The invention will be further understood by the following examples.

EXAMPLE 1

A phosphosulfurized hydrocarbon was prepared by reacting 100 parts by weight of a polyisobutylene having an average Staudinger molecular weight of about 850 with 15 parts by weight of phosphorus pentasulfide for about eight hours at a temperature in the range of 425° to 450° F., the mixture being stirred and blown with nitrogen during the reaction. The resulting phosphosulfurized polyisobutylene analyzed 3.75 wt. percent phosphorus and about 6.75 wt. percent sulfur.

To 710 grams of a mineral lubricating oil (153 SUS viscosity at 100° F.) there were added with stirring 508 grams (2 grams moles) of nonylphenol and 61.4 grams (1 gram mole) of a 98.5 wt. percent aqueous solution of ethylene diamine at room temperature. The temperature of the mixture increased 30° F. Heat was then applied to raise the temperature to 170° F.; then, while the mixture was stirred, 63.6 grams (2 gram moles) of paraformaldehyde (94.5% in water) was added over a period of 30 minutes. The temperature of the reaction mixture increased by 20° F. during the addition of the paraformaldehyde. The mixture was stirred for about 3 hours at a controlled temperature of 180° to 190° F. and was then heated to 300° F. and held at the latter temperature for about 1 hour while a stream of nitrogen was sparged into it to insure that essentially all of the water had been stripped from the mixture. No filtration of the reaction product was required.

The nonylphenol used in the above reaction was derived by alkylation of phenol with tripropylene and was essentially a mixture of 74.6 wt. percent of mononylphenol, 21.9 wt. percent of dinonylphenol, and 4 wt. percent of free phenol.

The phosphosulfurized polyisobutylene prepared as described above had a total acid number of 34.4. The alkylene amino phenol prepared as described above had a total base number of 88.6. The two materials were reacted together in the proportion of 71.9 wt. percent of the phosphosulfurized polyisobutylene and 28.1 wt. percent of the amino alkyl phenol for a period of four hours at 400° F. in a stainless steel kettle, under a slight vacuum (pressure-atmospheric, less 5 inches of Hg), the mixture being sparged with a stream of nitrogen.

EXAMPLE 2

The additive prepared as described in Example 1 was blended in 5% weight concentration in a highly refined lubricating oil base stock of SAE 30 viscosity grade. The blend (identified as Blend B) was then subjected to a 96-hour test in a Chevrolet 6-cylinder gas engine having a displacement of 216.5 cu. in. At the end of the test the engine was dismantled and various parts were rated, using a demerit system in which zero represents a perfectly clean part and 10 represents maximum deposits. The observed ratings are given in Table I, which follows, together with ratings in similar tests which were run, for comparison, on a blend of 5 wt. percent of the phosphosulfurized isobutylene in the same base oil (identified as Blend A), as well as on the base oil alone and on a widely marketed gas engine lubricant. The test conditions included a speed of 1500 r.p.m., a torque load of 120 to 130 lb. ft., spark advance of 30 degrees B.T.C., an oil temperature of 220° F. and a coolant temperature of 200° F. Natural gas, chiefly methane, was used as the fuel.

TABLE I.—GAS ENGINE DEMERIT RATINGS
[96-hour test]

| Demerits | Base oil | Blend A, base oil plus 5 wt. percent phosphosulfurized polyisobutylene | Blend B, base oil plus 5 wt. percent product of Example 1 | Commercial gas engine lubricant |
|---|---|---|---|---|
| Piston skirt varnish | 0.20 | 1.56 | Nil | 0.10 |
| Ring zone | 0.85 | 0.08 | 0.09 | 0.43 |
| Ring sticking | 1.9 | nil | nil | nil |
| Piston undersides | 1.2 | 0.12 | 0.12 | 0.50 |
| Overall demerit | 0.63 | 0.22 | 0.09 | 0.22 |
| Weight loss top compression ring mg. | 26 | 31 | 25 | 26 |
| Used oil viscosity (100° F.) increase, percent | 95 | 46 | 51 | 100 |

It will be seen from the data in Table I that while the phosphosulfurized polyisobutylene was quite effective in reducing the overall demerit rating of the base oil to a value comparable to that of the commercial lubricant it did have an adverse effect on piston skirt varnish. The product of Example 1, on the other hand, reduced the varnish demerit rating to essentially zero and at the same time reduced the overall demerit rating to a considerably lower figure than any of the other compositions.

EXAMPLE 3

Each of the blends described in Example 2 was subjected to a lubricant stability test in which the oil composition is heated for 23 hours at 340° F. in the presence of copper-lead bearings, the oil being intimately mixed with air during the test. The viscosity increase of the oil (SSU at 100° F.) and the corrosion weight loss of the bearings are determined at the end of the test. The results obtained are shown in Table II, which follows. It will be seen that the blend containing the product of Example 1 was superior to all of the other blends both with respect to viscosity increase at the end of the stability test and with respect to bearing weight loss.

TABLE II.—STABILITY TEST RESULTS

| | Percent viscosity increase | Copper-lead bearing weight loss, mg. |
|---|---|---|
| Base oil | 50 | 332 |
| Base oil plus 5% Phosphosulfurized polyisobutylene | 23 | 13 |
| Base oil plus 5% Product of Example 1 | 12 | 8 |
| Commercial gas engine lubricant | 63 | 177 |

EXAMPLE 4

Blends A and B of Example 2 were subjected to a test for H₂S evolution in which test an 800 cc. sample of the oil is placed in a 1-liter stoppered container and then heated in an oven for one hour at 100° F.; then moistened lead acetate paper is placed over the neck of the uncapped container for five minutes and thereafter dried and compared with standardized test spots rated numerically from zero (perfectly white) to 5 (essentially black). In this test, Blend A gave a rating of 5 while Blend B (containing the product of Example 1) gave a rating of 1. It is thus seen that the product of the present invention was superior to untreated phosphosulfurized polyisobutylene with respect to H₂S evolution.

EXAMPLE 5

Using a phosphosulfurized polyisobutylene prepared in the manner described in Example 1 and having a total acid number of 33.2 and an alkylene amino phenol also prepared in the manner described in Example 1 and having a total base number of 60, 63.5 parts by weight of the former were reacted with 36.5 parts by weight of the latter by heating them together at 350° F. in a 1-liter flask for four hours. A blend of the product in 5 wt. percent concentration in an SAE 30 base stock gave a rating of 1.5 in the H₂S evolution test described in Example 4 and an overall gas engine demerit rating of 0.11 in the engine test described in Example 2.

EXAMPLE 6

A mixture is prepared by adding 948 grams (4 moles) of mixed nonylphenols (75 wt. percent mononoylphenol, 22 wt. percent dinonylphenol) to 1710 grams of a diluent mineral oil (100 SUS viscosity at 100° F.). To this is then added 180 grams (3 moles) of ethylene diamine and the mixture is heated to 180° F. Then 240 grams (8 moles) of paraformaldehyde is added gradually, the temperature being maintained in the 180° to 200° F. range. Reaction is continued for three hours at 180° to 200° F. and the temperature is then raised to 300° F. while sparging with nitrogen to remove water, and the product is filtered. The product analyzes 2.76 wt. percent nitrogen and has a total base number of 68.8 mg. HCl per gram of sample.

One equivalent of the alkylene amino phenol prepared as just desbribed is reacted with two equivalents of a phosphosulfurized polyisobutylene of about 800 molecular weight by heating the two materials together for 28 hours at 350° F.

An additive prepared in this manner was blended in 3 wt. percent concentration in a mineral lubricating oil base stock of SAE 30 grade. The blend gave a rating of 1 in the H₂S evolution test described in Example 4 and a copper-lead bearing weight loss or 1 mg. and a 10.6% viscosity increase in the stability test described in Example 3.

EXAMPLE 7

About 0.007 wt. percent of the product of Example 1 is incorporated in a leaded gasoline to impart carburetor detergency action thereto.

EXAMPLE 8

An ashless dispersant was prepared by chlorinating polyisobutylene of 950 molecular weight to a chlorine content of 4.33%, condensing 600 parts by weight of the chlorinated polymer with 55 parts by weight of acrylic acid at 450° F. for 18 hours to prepare polyisobutenyl propionic acid and forming the amide of the latter acid with tetraethylene pentamine. The amide was prepared in the form of a concentrate by mixing 355 parts by weight of the polyisobutenyl propionic acid, 132 parts by weight of a solvent mineral oil (150 ssu viscosity at 100° F.) and 44 parts by weight of tetraethylene pentamine, stirring the mixture at 300° F. for five hours while purging with nitrogen to remove water of reaction, and filtering the product.

A lubricating oil blend was prepared by adding 2 wt. percent of the dispersant concentrate just described and 5 wt. percent of the additive of Example 1 to a refined paraffinic lubricating oil base stock of 95 viscosity index and 65 SUS viscosity at 210° F. The blend gave an overall rating of 0.05 in the 96-hour engine test described in Example 2.

EXAMPLE 9

The storage stability properties of a heating oil comprising a mineral oil destillate having a boiling range of about 360° to 660° F. and derved from mixed straight run and cracked distillates are improved by incorporating therein 0.03 wt. percent of the reaction product of Example 6.

The additives of this invention may employed in concentrations ranging from about 0.002 to about 10 wt. percent in oil compositions ranging from gasoline fractions through middle distillate fuels and lubricating oils.

For use as lubricating oil additives the reaction products of this invention may be incorporated in lubricating oil compositions in concentration ranges of from about 0.1 to about 10 wt. percent on an actual ingredient basis, and will ordinarily be used in concentrations of from about 0.1 to about 5 wt. percent. The lubricating oils to which the additives of the invention may be added include not only mineral lubricating oils, but synthetic oils also. The mineral lubricating oils may be of any preferred types, including those derived from the ordinary paraffinic, naphthenic, asphaltic, or mixed base mineral crude oils by suitable refining methods. Synthetic hydrocarbon lubricating oils may also be employed. Other synthetic oils include dibasic acid esters such as di-2-ethyl hexyl sebacate, carbonate esters, phosphate esters, halogenated hydrocarbons, polysilicones, polyglycols, glycol esters such as C₁₃ oxo acid diesters of tetraethylene glycol, and complex esters as for example the complex ester formed by the reaction of 1 mole of sebacic acid with 2 moles of tetraethylene glycol and 2 moles of 2-ethyl hexanoic acid.

The additives of this invention may also be employed in middle distillate fuels for inhibiting corrosion and the formation of sludge and sediment in such fuels. Concentration ranges of from bout 0.002 to about 2 wt. percent or more, generally from about 0.005 to about 0.2 wt. percent are employed. Petroleum distillate fuels boiling in the range of from about 300° to about 900° F. are contemplated. Typical of such fuels are No. 1 and No. 2 fuel oils that meet ASTM Specification D–396–48T, diesel fuels qualifying as Grades 1D, 2D and 4D of ASTM Specification D–975–51T, and various jet engine fuels. Because they are ashless, these additives are particularly desirable for such fuels in that they do not give rise to glowing ashes nor deter from the burning qualities of the distillates. These additives may also be used in conjunction with other prior art ashless additives for fuels, such as polymers of acrylic or methacrylic acid esters, high molecular weight aliphatic amines, etc.

The additives of this invention may also be employed either alone or in combination with other hydrocarbon-soluble additives, in jet fuels and gasolines in concentrations ranging from 0.001 to 1.0 wt. percent as detergent and/or rust preventive additives.

In either the fuel or lubricant compositions, other conventional additives may also be present, including dyes, pour-point depressants, antiwear agents, e.g., tricresyl phosphate, zinc dialkyl dithiophosphates of 3 to 8 carbon atoms, antioxidants such as phenyl-alpha-naphthylamine, tert. octylphenol sulfide, bis-phenols such as 4,4'-methylene bis(2,6-di tert. butylphenol), viscosity index improvers such as polymethacrylates, polyisobutylene, alkyl fumarate-vinyl acetate copolymers, and the like, as well as other dispersants.

The dispersant additives of the invention may be employed to enhance the dispersancy-detergency and/or to improve the oxidation stability or corrosion inhibiting of lubricants containing conventional detergents, wherein the latter are used in concentrations in the range of about 0.5 to 5 wt. percent. When the conventional detergents or dispersants are metal-containing materials it is possible, by utilizing the additves of the present invention in combination therewith, to obtain added dispersancy or detergency wthout materially increasing the total ash-forming properties of the composition. Such metal-containing detergents or combination detergent-inhibitors include the alkaline earth metal salts of alkylated phenols or or alkylated phenol sulfides, as for example barium-calcium nonylphenol sulfide, and the alkaline earth metal salts of high molecular weight sulfonic acids derived from natural or synthetic hydrocarbons, such as calcium petroleum sulfonate or an overbased barium $C_{12}$ alkyl benzene sulfonate.

The dispersants of this invention may also be used in conjunction with other ashless detergents or dispersants such as high molecular weight polymeric dispersants made with one or more polar monomers, such as vinyl acetate, vinyl pyrrolidone, methacrylates, fumarates and maleates. These dispersants have molecular weights in the range of about 500 to 50,000. One example is a copolymer of 65 to 85 wt. percent of mixed $C_9$ to $C_{12}$ fumarates, 10 to 20 wt. percent of vinyl acetate, and 5 to 15 wt. percent of N-vinyl pyrrolidone. Still other ashless dispersants include nitrogen-containing derivatives of high molecular weight alkenyl succinic anhydrides such as described in U.S. Patents 3,018,247, 3,018,250 and 3,018,921; in British Patent 922,831; and in Canadian Patent 666,916. A particularly effective derivative of this general type is prepared by reacting a long-chain alkenyl succinic anhydride (derived by condensation of polyisobutylene of about 1,000 molecular weight with maleic anhydride) with and alkylene polyamine, specifically tetraethylene pentamine, to form an N-substituted alkenyl succinimide.

An additional type of dispersant that can be employed is prepared by halogenating a 600 to 3,000 molecular weight polymer of a $C_2$ to $C_5$ olefin, e.g., polyisobutylene, condensing the halogenated polymer with an unsaturated $C_3$ to $C_8$ monocarboxylic acid, e.g., acrylic acid, and then reacting the resulting long-chain acid with an alkylene polyamine to form an amide. Additives of this type are disclosed and claimed in copending application Ser. No. 337,187 of Roger E. Chandler, filed Jan. 13, 1964, and now abandoned.

It is possible in practicing this invention to prepare additive concentrates in which the concentration of additive is greater than would normally be employed in a finished lubricant. These concentrates may contain in the range of from 10 to 80% of additive on an active ingredient basis, the balance being a hydrocarbon oil, usually a mineral oil. Such concentrates are convenient for handling the additive in the ultimate blending operation into a finished lubricating oil composition. The additive concentrates may be made up simply of an additive of the present invention in a suitable mineral oil medium or they may include other additives that are intended for use along with the additives of the invention in a finished lubricant.

While the lubricant compositions herein described are primarily designed as internal combustion engine crankcase lubricants, the additives of the invention may also be employed in other oil compositions, including turbine oils, various industrial oils, gear oils, hydraulic fluids, transmission fluids and the like.

What is claimed is:

1. An oil-soluble additive which comprises the product obtained by reacting one molar proportion of a phosphosulfurized hydrocarbon with from 0.5 to 4 molar proportions of an alkylene amino phenol derived from an aldehyde of from 1 to 7 carbon atoms, an alkyl phenol having a total of from 4 to 24 carbon atoms in alkyl groups, and an alkylene polyamine having alkylene groups of from 2 to 6 carbon atoms and having from 2 to 10 nitrogen atoms, said reaction being conducted at a temperature in the range from about 200° to 450° F., said phosphosulfurized hydrocarbon being selected from the class consisting of a phosphosulfurized terpene, a phosphosulfurized petroleum fraction, and a phosphosulfurized olefin polymer of from 500 to 200,000 molecular weight and containing from 2 to 6 carbon atoms per olefin monomer.

2. An oil-soluble additive as defined by claim 1 wherein said phosphosulfurized hydrocarbon comprises $P_2S_5$-treated polyisobutylene.

3. An oil-soluble additive as defined by claim 1 wherein said alkylene amino phenol is derived from formaldehyde, ethylene diamine and nonylphenol.

4. A method for preparing an oil-soluble dispersant which comprises reacting 1 molar proportion of a phosphosulfurized hydrocarbon with from 0.5 to 4 molar proportions of an alkylene amino phenol derived from an aldehyde of from 1 to 7 carbon atoms, an alkyl phenol having from 4 to 24 total carbon atoms in alkyl groups, and an alkylene polyamine having alkylene groups of from 2 to 6 carbon atoms and having from 2 to 10 nitrogen atoms, said reaction being conducted at a temperature in the range of from 200° to 450° F., said phosphosulfurized hydrocarbon being selected from the class consisting of a phosphosulfurized terpene, a phosphosulfurized petroleum fraction, and a phosphosulfurized olefin polymer of from 500 to 200,000 molecular weight and containing from 2 to 6 carbon atoms per olefin monomer.

5. Method as defined by claim 4 wherein said phosphosulfurized hydrocarbon comprises the reaction product of an olefin polymer of 500 to 200,000 molecular weight with from 5 to 40 wt. percent of $P_2S_5$, said olefin polymer containing from 2 to 6 carbon atoms per olefin monomer.

6. Method as defined by claim 4 wherein said molar proportions are about 1 to 1.

7. Method as defined by claim 4 wherein said alkylene amino phenol is derived from an alkyl phenol, formaldehyde, and ethylene diamine.

References Cited

FOREIGN PATENTS 970,880   9/1964   Great Britain.

CHARLES B. PARKER, Primary Examiner

D. R. PHILLIPS, Assistant Examiner

U.S. Cl. X.R.

44—72; 252—32.7, 152; 260—79, 561, 570.5